March 24, 1964  P. VAN ZONNEVELD ETAL  3,126,269
GLASS FEEDER INTENDED FOR A CONTINUOUS, UPWARD SUPPLY
OF GLASS TO A SYSTEM FOR DRAWING GLASS TUBES OR RODS
Filed June 4, 1958
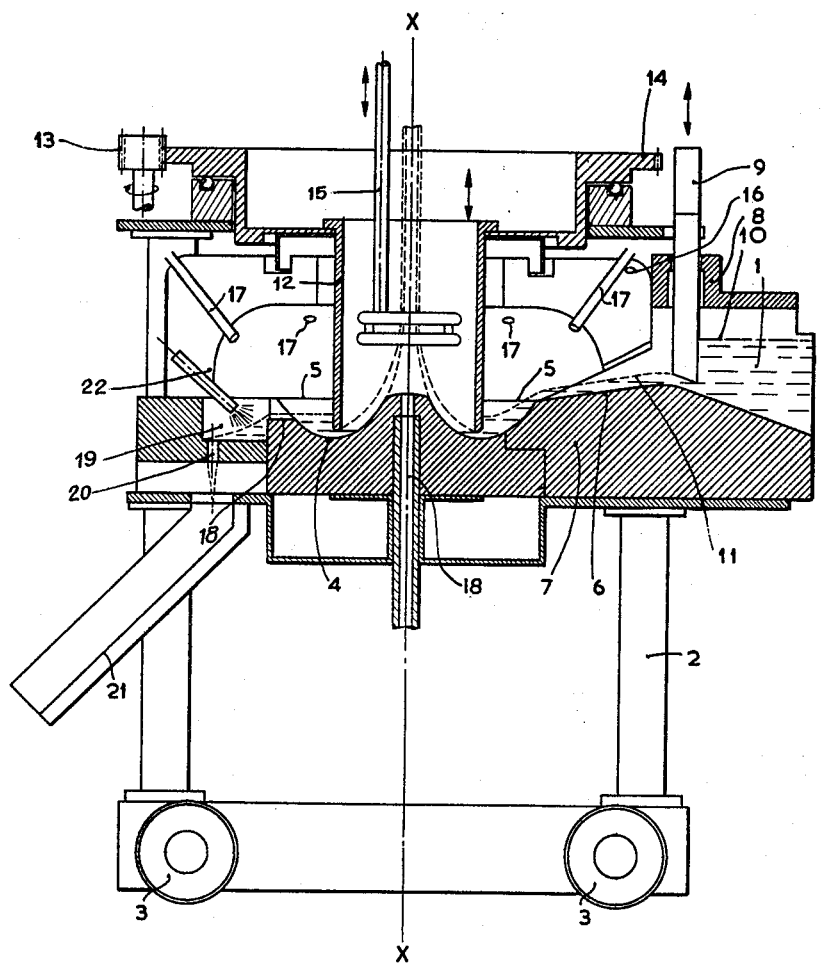
INVENTORS
PIETER VAN ZONNEVELD
FREDRIK BEREND JAN WIEGMAN
BY
AGENT

United States Patent Office 3,126,269
Patented Mar. 24, 1964

3,126,269
GLASS FEEDER INTENDED FOR A CONTINUOUS, UPWARD SUPPLY OF GLASS TO A SYSTEM FOR DRAWING GLASS TUBES OR RODS
Pieter van Zonneveld and Fredrik Berend Jan Wiegman, Eindhoven, Netherlands, assignors to North American Philips Company, Inc., New York, N.Y., a corporation of Delaware
Filed June 4, 1958, Ser. No. 739,773
Claims priority, application Netherlands June 8, 1957
4 Claims. (Cl. 65—191)

A glass feeder for continuously conducting glass away in an upward direction to a system for drawing glass tubes or glass rods is known; with this feeder the zone of drawing is surrounded by a sheath, the lower rim of which lies on a lower level than the upper rim of the melting pot, this sheath being furthermore surrounded by a glass heating device.

Glass feeders for conducting glass in an upward direction for the production of glass tubes or glass rods are attractive for the manufacturers of these glass articles, since they permit of supplying a quantity of glass per unit time that can be efficiently worked up in manufacture of medium capacity. In this respect this kind of machine compares favourably with machines in which the glass leaves the feeder in a horizontal direction, since the production of such machines is, in general, much higher than can be worked up, so that occasionally the production must be stopped.

The present invention relates to an improved glass feeder of the aforesaid kind which provides an improved continuity of the production of glass tubes or glass rods of satisfactory quality in comparison with the known machines.

The glass feeder according to the invention has the feature that the said heating device outside the sheath consists of a plurality of burners arranged around the axis of the stationary melting pot and that the glass supply to the glass melting pot is connected, practically without interruption, with the upper rim of the glass melting pot, which upper rim has a void at a different place of the circumference, this void communicating with a glass outlet duct, which may be provided with a heating device for the glass flowing through this duct.

In contradistinction to the known glass feeder, in which the glass melting pot rotates about its own axis during operation, the melting pot is stationary with the feeder according to the invention, so that it is possible to connect the glass supply practically without interruption with the upper rim of the melting pot. This has the advantage that the glass can flow substantially uninterruptedly from the supply into the glass melting pot, so that substantially no gas is included in the flowing glass. This results in an improved quality of the glass tubes or glass rods to be produced. The burners may furthermore be arranged outside the sheath around the circumference of the melting pot about the axis thereof at regular intervals, so that the glass will be heated substantially uniformly throughout the circumference.

Since the melting pot stands still, the upper layer of the glass can be conducted away out of the melting pot at a predetermined place in a regular flow, so that this glass does not arrive in the product. This is advantageous, since this upper layer of the glass in the melting pot, particularly if it is intended to obtain products of boro-silicate hard glass, tends to alter its composition owing to the heating, which would lead to a product of inferior quality. The glass outlet, which communicates with the void in the rim of the glass melting pot, this void thus serving as a draining for the upper glass layer of the melting pot, ensures that during operation of the feeder this upper layer is conducted away continuously at a predetermined place, so that the feeder can be operated practically without interruption. If hard glass is worked up, a suitable area is obtained at the same time to arrange any desired heating device, which ensures a continuous drainage of the glass which is undesirable for the production.

This heating device may be formed by one or a plurality of burners. With certain kinds of glass, however, this heating changes the composition of the glass, so that the glass becomes viscous to such an extent that, in spite of the heating, a regular drainage of the glass unwanted for the production is not ensured. In the latter case use may be made, in accordance with an advantageous embodiment of the invention, of an electrical heating device arranged at the area of the outlet, this device consisting of current supply electrodes arranged below the glass level in the overflow. The electrical current passing through the glass located between these electrodes keeps this glass sufficiently thin fluid to ensure a regular drainage.

In an advantageous embodiment of the feeder according to the invention the sheath, the lower rim of which lies at a lower level than the upper rim of the melting pot during operation, is adjustable in the direction of height. Thus the thickness of the upper layer of glass to be conducted away from the melting pot can be controlled at will.

According to a further aspect of the feeder according to the invention the said sheath rotates during the operation of the feeder, which furthers the uniform distribution of heat in the glass outside and inside the sheath.

The invention will be described more fully with reference to the drawing in which the sole figure is an elevational view partly in section.

The feeder shown in the drawing, which is intended to be arranged at the area 1 in front of the outlet port of a glass furnace, is supported by a frame 2, which is mounted on wheels 3. The feeder comprises a stationary glass melting pot 4, which is symmetrical about the axis X—X. The upper rim of this pot is designated by 5. With this upper rim is connected, on the right-hand side of the drawing, the slightly inclining upper surface 6 of a body 7 of refractory material; this upper layer serves as a supply guide to the melting pot for the glass emanating from the furnace. The port at the area 1 of the feeder, through which port the molten glass enters the feeder, is limited on the upper side by a plate-shaped part 8, in which a control-slide 9 is adapted to move up and down. This slide controls the thickness of the glass on the supply guide 6. This is indicated in broken lines; the broken line 10 illustrates the glass level in the furnace, the broken line 11 the upper level of the glass layer on the surface 6.

About the axis X—X is furthermore arranged the sheath 12, which is adjustable in the direction of height and which is driven by means of a pinion 13 and the toothed rim 14, so that it rotates during operation of the feeder. Inside the sheath 12 is housed the cooling device 15. This device is also adjustable in a vertical direction; its position contributes to the control of the dimensions of the product.

The part of the melting pot located outside the sheath 12 is roofed in by a hood 16, in which, at regular intervals, burners 17 are arranged. These burners heat the glass contained in this space and directly and indirectly the glass contained inside the sheath 12. The pot body 4 has a vertical bore 18 in the direction of the axis X—X, through which compressed air is blown in the case of a production of glass tubes. This heating also contributes to the control of the dimensions of the product.

In the embodiment shown the melting pot rim 5 is provided diametrically opposite the glass supply over the slightly inclining surface 6, with a void 23, which communicates with a space 19, which communicates through an opening 20 with a glass drainage 21. In this case a burner 22 is arranged over the space 19. However, as an alternative, current supply electrodes may be arranged in this space in a manner such that their active terminals are located below the glass level, indicated in broken lines. The current passing through the glass located between the said electrodes keeps this glass sufficiently thin fluid to ensure a regular drainage through the opening 20.

During operation of the feeder, i.e. when the melting pot 4 is stationary and the sheath 12 rotates, while the burners 17 are operative, compressed air is supplied through the duct 18 to the system and the control-slide 9 occupies the position shown, the glass flowing over the slightly inclining surface 6 will arrive gradually in the glass melting pot 4, where it rises to the level indicated by the broken line. From the drawing it is evident that, owing to the sheath 12, the level of the glass is materially lower inside this sheath than outside it. The drawing device (not shown) draws upwards, in a tubular shape, the glass contained inside the sheath 12.

From the drawing it is furthermore evident that in this case the draw slot of the glass is formed by the lower rim of the sheath 12 and the upper rim of the central part of the glass melting pot. If the sheath 12 had a comparatively much larger diameter, the lower rim of the sheath 12 would, as a rule, no longer serve as a boundary of the drawing slot, but then on the inner side of this sheath there is first an annular glass zone with a horizontal level, which is deformed into an upward glass boundary at a certain distance away from the sheath.

Owing to the lower level of the glass inside the sheath 12 and owing to the provision of the overflow 23, the upper layer of the glass in the melting pot, which glass may have modified its composition owing to the action of the burner 17, which occurs, as stated above, particularly in the case of borosilicate hard glass, will flow away regularly through the said duct and will therefore not be contained in the product. The burner 22 ensures that the glass drainage formed by the space 19 and the opening 20 will not be blocked, so that accumulation of waste glass need not be feared. With the aid of the system shown glass tubes or glass rods of different dimensions can be made. The machine is suitable, for example, for the manufacture of glass tubes to be used as hard-glass flanged tubes, having an outer diameter of about 14 mms. and a wall thickness of about 1.5 mms. As an alternative, the machine may be used for the manufacture of glass tubes having an outer diameter of 30 mms. and a wall thickness of 0.5 to 1 mm. With a particular type of machine the variations in diameter and wall thickness of the product are obtained by adjusting the sheath 12 and the cooling body 15 and by the choice of the temperature thereof, and by controlling the quantity of air supplied per unit time through the bore 18.

When the central bore 18 is closed, the feeder produces glass rods instead of glass tubes; the diameter of these rods may be varied also within wide limits.

With a suitable choice of the sizes of the feeder parts, products may be obtained by means of such a machine, which have considerably larger dimensions, for example glass tubes having a diameter of 100 mms. and a wall thickness of, for example, 3 mms.

What is claimed is:
1. In a drawing apparatus for glass tubes or rods a glass feeder device comprising a tube having a lower rim surrounding the drawing zone, a stationary melting pot having an upper rim, means supporting said melting pot whereby the upper rim thereof is located on a higher plane than the lower rim of said tube, a plurality of heating elements for the molten glass surrounding said tube and about the central axis of said melting pot, a recess in said upper rim of the melting pot at a selected location, a glass drainage opening located at a level below said recess, overflow means connecting said recess and glass drainage opening, and a heating device mounted adjacent to said glass drainage opening whereby said glass conducted from the melting pot through the recess and the drainage opening is maintained in a fluid state.

2. In a drawing apparatus for glass tubes or rods a glass feeder device comprising a tube having a lower rim surrounding the drawing zone, a stationary melting pot having an upper rim and inlet means, means supporting said melting pot whereby the upper rim thereof is located on a higher plane than the lower rim of said tube, a plurality of heating elements for the molten glass surrounding said tube and about the central axis of said melting pot, a recess in said upper rim of the melting pot diametrically opposite said inlet means, a glass drainage opening located at a level below said recess, overflow means connecting said recess and glass drainage opening, and a heating device comprising a plurality of current supply electrodes arranged below the level of the glass in said overflow means and adjacent to said glass drainage opening thereby continually maintaining said glass in a fluid state in that region.

3. In a drawing apparatus for glass tubes or rods a glass feeder device comprising a tube having a lower rim surrounding the drawing zone, a stationary melting pot having an upper rim, means supporting said melting pot whereby the upper rim thereof is located on a higher plane than the lower rim of said tube, a plurality of heating elements for the molten glass surrounding said tube and about the central axis of said melting pot, a recess in said upper rim of the melting pot at a selected location, a glass drainage opening located at a level below said recess, overflow means connecting said recess and glass drainage opening, a heating device mounted adjacent to said glass drainage opening whereby said glass conducted from the melting pot through the recess and the drainage opening is maintained in a fluid state, and means on said glass feeder device for moving said tube in its direction of length.

4. A glass feeder device as claimed in claim 3 further comprising means mounting said tube for rotation upon the operation of said feeder device.

References Cited in the file of this patent

UNITED STATES PATENTS

| 1,538,229 | Weaver | May 19, 1925 |
| 1,894,201 | Salomon | Jan. 10, 1933 |
| 2,085,245 | Woods | June 29, 1937 |
| 2,591,304 | Schuller | Apr. 1, 1952 |
| 2,680,772 | Skinner et al. | June 8, 1954 |

FOREIGN PATENTS

| 675,000 | Great Britain | July 16, 1952 |